United States Patent
Wu et al.

(10) Patent No.: US 10,426,266 B2
(45) Date of Patent: Oct. 1, 2019

(54) QUICK MOUNTING HOLDER STRUCTURE FOR SINKING MECHANICAL EXTENSION DEVICE OF FUNCTIONAL SOFA

(71) Applicant: Remacro Machinery & Technology (Wujiang) Co, Ltd., Suzhou (CN)

(72) Inventors: Linlin Wu, Suzhou (CN); Xiaohong Li, Suzhou (CN); Jiao Chen, Suzhou (CN); Zhong Pang, Suzhou (CN)

(73) Assignee: Remacro Machinery & Technology (Wujiang) Co. Ltd., Suzhou (CN)

( * ) Notice: Subject to any disclaimer, the term of this patent is extended or adjusted under 35 U.S.C. 154(b) by 191 days.

(21) Appl. No.: 15/658,414

(22) Filed: Jul. 25, 2017

(65) Prior Publication Data

US 2018/0368576 A1    Dec. 27, 2018

(30) Foreign Application Priority Data

Jun. 26, 2017    (CN) .......................... 2017 1 0494163

(51) Int. Cl.
*A47C 1/032*    (2006.01)
*A47C 17/04*    (2006.01)
*A47C 1/034*    (2006.01)

(52) U.S. Cl.
CPC .............. *A47C 1/032* (2013.01); *A47C 1/034* (2013.01); *A47C 17/04* (2013.01)

(58) Field of Classification Search
CPC .......... A47C 1/032; A47C 1/034; A47C 17/04
USPC ....................................................... 297/440.1
See application file for complete search history.

(56) References Cited

U.S. PATENT DOCUMENTS

| | | | |
|---|---|---|---|
| 8,376,462 B2 * | 2/2013 | Marini .................. | B64D 11/06 297/440.1 |
| 8,480,179 B2 * | 7/2013 | Griggs, Jr. ............... | A47C 4/08 297/440.14 |
| 9,629,466 B2 * | 4/2017 | Griggs, Jr. ............... | A47C 1/02 |
| 2013/0118129 A1 * | 5/2013 | Griggs ..................... | A47C 4/02 297/440.1 X |

* cited by examiner

*Primary Examiner* — Anthony D Barfield

(57) ABSTRACT

The present invention discloses a quick mounting holder structure for sinking mechanical extension device of functional sofa, which includes a mounting support, a stretchable component, a backrest component, and a main body. The mounting support, the stretchable component, the backrest component are rotatably installed in the main body. The mounting support includes a crossbeam and at least one mounting piece. The crossbeam includes a side panel. At least one mounting piece is fixed on the side panel and is perpendicular to the side panel. The mounting support and wooden frame are fixed by an electric drill using a screw through the mounting hole. The operation is simple and quick. Further, at least one mounting piece is fixed on the side panel, lowering the mounting height, so that the height of the whole sofa and rocking chair is lowered. Thus, the comfortableness of the user is improved.

8 Claims, 5 Drawing Sheets

QUICK MOUNTING HOLDER STRUCTURE FOR SINKING MECHANICAL EXTENSION DEVICE OF FUNCTIONAL SOFA

CROSS REFERENCE TO RELATED APPLICATIONS

This application is based upon and claims priority to Chinese Patent Application No. 201710494163.3, filed on Jun. 26, 2017, the entire contents of which are incorporated herein by reference.

TECHNICAL FIELD

The present invention relates to the furniture industry, particularly to a quick mounting holder structure for sinking mechanical extension device of functional sofa.

BACKGROUND

With the improvement of the domestic productivity level and the development of the social economic level, the public's standard of living is rising, thereby increasing the demand for furniture. . Furniture such as sofas, rocking chairs, seats, etc. are common everywhere. Currently, during production of sofas, rocking chairs, seats, etc., iron brackets are produced first, and then the wooden frame is installed on the iron bracket.

However, the iron bracket in the prior art has the following deficiency:

When the wooden frame is mounted on the iron bracket, the wooden frame needs to be put on the iron bracket, which is time-consuming and labor intensive. Further, the height of the sofa or rocking chair is too high after installation, which will decrease the comfort of the user.

SUMMARY OF THE INVENTION

In order to overcome the deficiency of the prior art, the object of the present invention is to provide a quick mounting holder structure for sinking mechanical extension device of functional sofa.

The object of the present invention is realized by technical solutions as below:

A quick mounting holder structure for sinking mechanical extension device of functional sofa includes a mounting support, a stretchable component, a backrest component, and a main body. The mounting support, the stretchable component, the backrest component are rotatably installed on the main body. The mounting support includes a crossbeam and at least one mounting piece. The crossbeam includes a side panel. At least one mounting piece is fixed on the side panel and is perpendicular to the side panel. At least one fixing hole and at least one mounting hole are provided on the at least one mounting piece.

Further, the at least one mounting piece is made by bending the side panel. An opening is formed between the at least one mounting piece and the side panel.

Further, the at least one mounting piece is parallel to the horizontal plane.

Further, the at least one fixing hole is a circular hole.

Further, the at least one mounting hole is an oval hole.

Further, the main body includes a first connecting plate and a second connecting plate fixedly connected to the first connecting plate. A second rotation point and a third rotation point are provided on the first connecting plate. The mounting support is rotatably connected to the main body via the second rotation point and the third rotation point. The backrest component includes a connecting rod. A first rotation point is provided on the connecting rod. The backrest component is rotatably connected to the main body via the first rotation point.

Further, the quick mounting holder structure for sinking mechanical extension device of functional sofa further includes a first hanging column, a second hanging column and an elastic element. The first hanging column is fixed on the first connecting plate. The second hanging column is fixed on the connecting rod. Two ends of the elastic element are fixed on the first hanging column and the second hanging column respectively.

Further, the first hanging column is located between the second rotation point and the third rotation point.

Further, the elastic element is a spring.

Compared to the prior art, the mounting support of the quick mounting holder structure for sinking mechanical extension device of functional sofa of the present invention includes a crossbeam and at least one mounting piece. The crossbeam includes a side panel. At least one mounting piece is fixed on the side panel and is perpendicular to the side panel. At least one fixing hole and at least one mounting hole are provided on the at least mounting piece. When the wooden frame is to be mounted on the mounting support, the user only needs to turn over the mounting support and put the wooden frame under the mounting support. The mounting support and the wooden frame can be fixed by an electric drill using screws through the mounting hole. The operation is simple and quick. Further, at least one mounting piece is fixed on the side panel, lowering the mounting height, so that the height of the whole sofa or rocking chair is reduced. Thus, the comfortableness of the user is improved.

Figure 1:
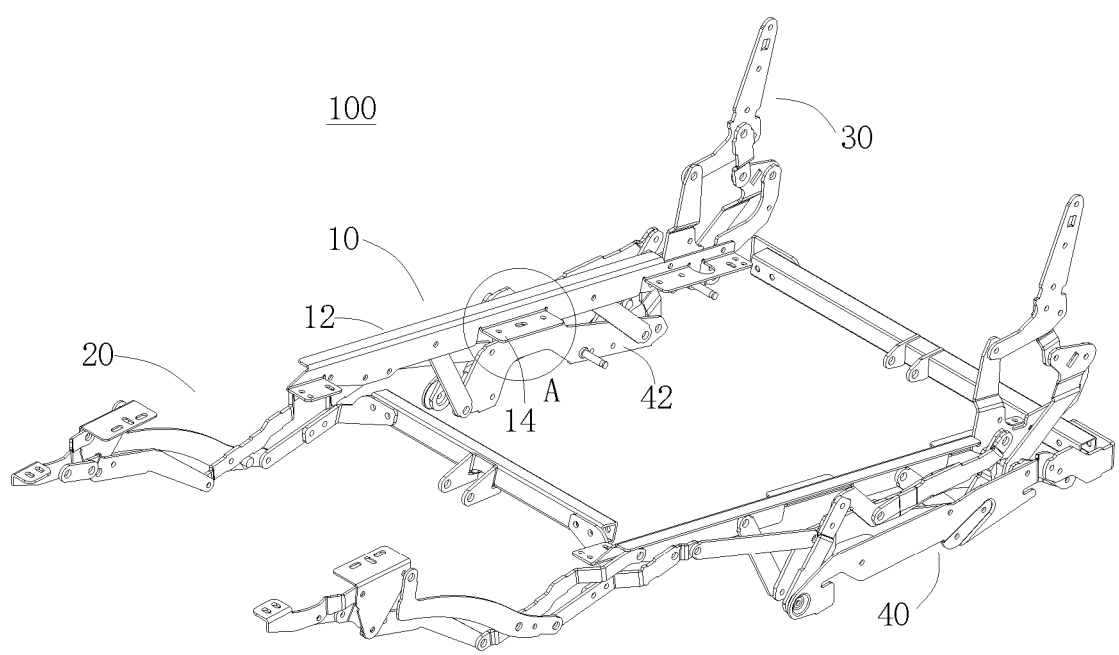
FIG. 1 is a perspective view of the quick mounting holder structure for sinking mechanical extension device of functional sofa of the present invention.
Figure 2:
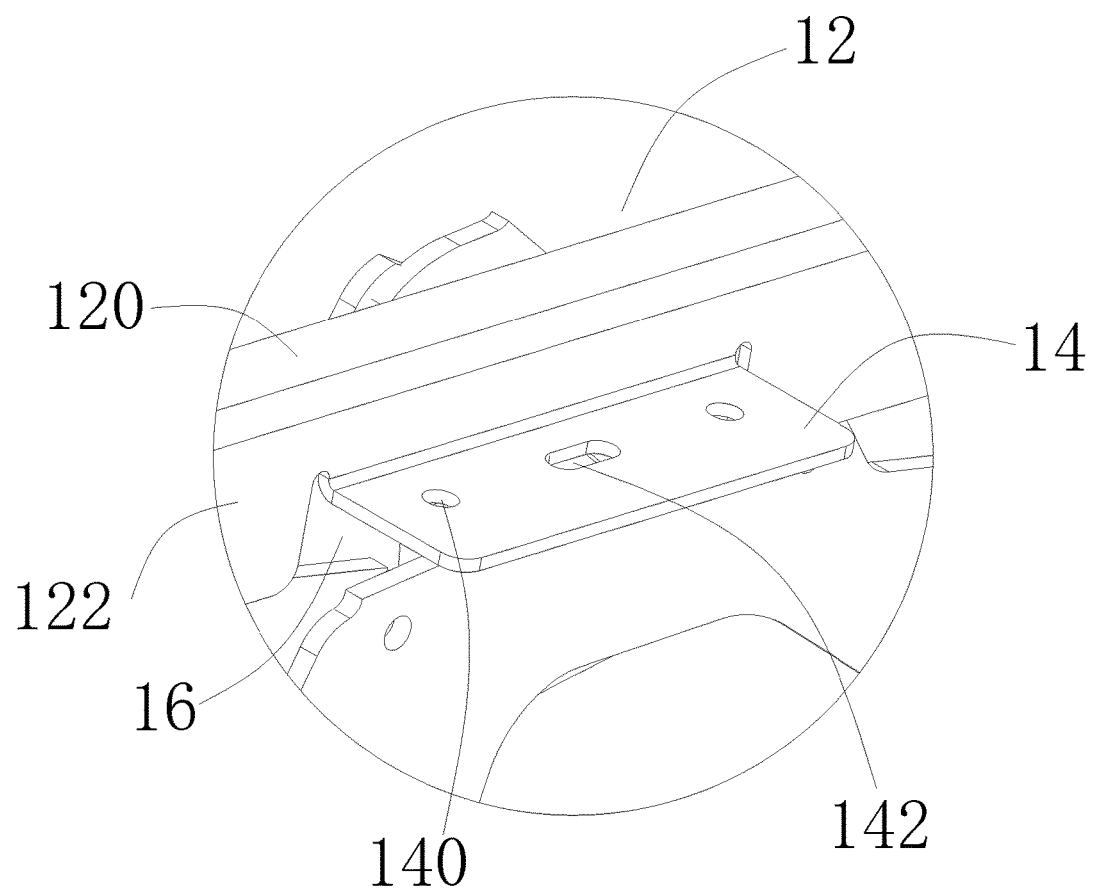
FIG. 2 is an enlarged view of the A area of the quick mounting holder structure for sinking mechanical extension device of functional sofa shown in FIG. 1.
Figure 3:
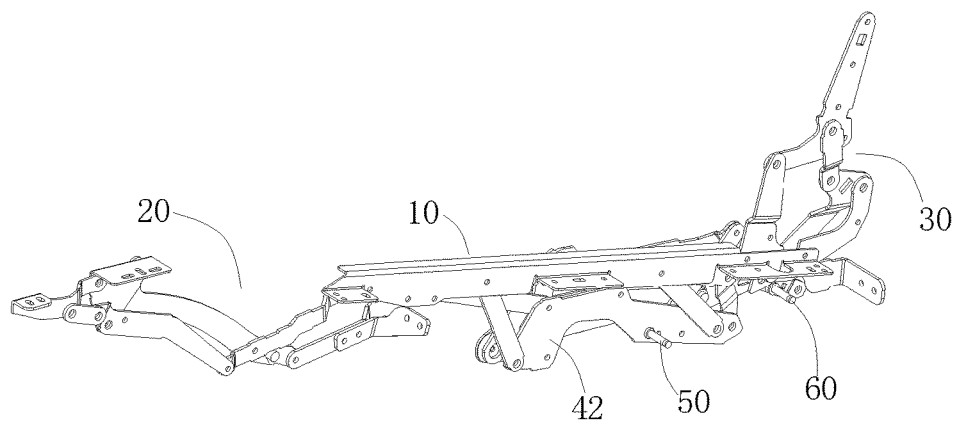
FIG. 3 is a lateral view of the quick mounting holder structure for sinking mechanical extension device of functional sofa shown in FIG. 1.
Figure 4:
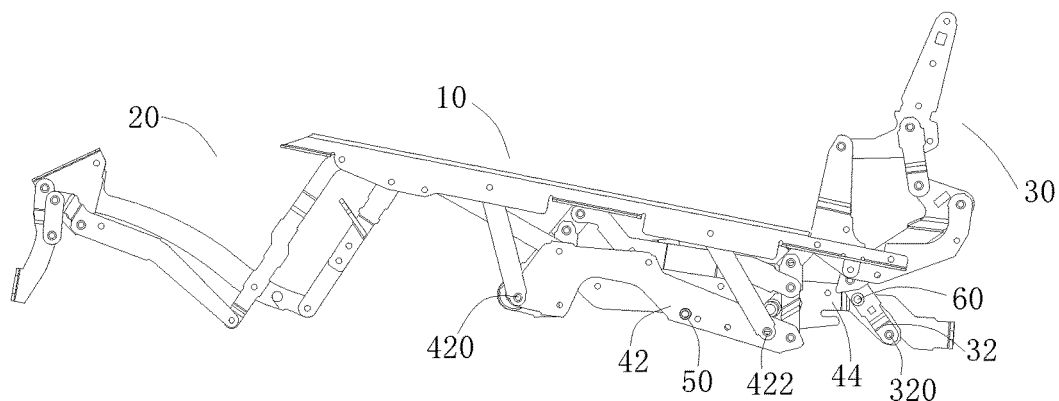
FIG. 4 is another lateral view of the quick mounting holder structure for sinking mechanical extension device of functional sofa shown in FIG. 1.

In the Figures: 100. quick mounting holder structure for sinking mechanical extension device of functional sofa; 10. mounting support; 12. crossbeam; 120. main board; 122. side panel; 14. mounting piece; 140. fixing hole; 142. mounting hole; 16. opening; 20. stretchable component; 30. backrest component; 32. connecting rod; 320. the first rotation point; 40. main body; 42. the first connecting plate; 420. the second rotation point; 422. the third rotation point; 44. the second connecting plate; 50. the first hanging column; 60. the second hanging column; 200. wooden frame; 300. base.

DETAILED DESCRIPTION OF THE INVENTION

Hereinafter, the technical solution of the embodiments of the present invention will be clearly and completely described with reference to the accompanying drawings of the embodiments of the present invention. Obviously, the described embodiments are merely some of the embodiments of the invention and are not intended to be exhaustive. Based on embodiments of the present invention, any other embodiments derived by an ordinary person skilled in the art without making creative work are within the scope of the present invention.

It should be noted that when a component is referred as "being fixed to" another component, the component can be directly fixed on another component or with an intermediate component. When a component is referred as "being connected to" another component, the component can be directly connected to another component or with an intermediate component. When a component is referred as "being provided on" another component, the component can be directly provided on another component or with an intermediate component. The terms "perpendicular", "horizontal", "left", "right", and similar expressions used in the context are only for the purpose of explanation.

Unless otherwise defined, all technical and scientific terms used herein have the meanings commonly understood by the ordinary person skilled in the art. The terms used in the specification of the present invention are only intended to describe the embodiments, but not to limit the invention. The term "and/or" used in the context includes any and all combinations of one or more related items.

Referring to FIG. 1 through FIG. 4, quick mounting holder structure for sinking mechanical extension device of functional sofa 100 includes mounting support 10, stretchable component 20, backrest component 30, main body 40, the first hanging column 50, the second hanging column 60, and an elastic element.

Mounting support 10 includes crossbeam 12 and a plurality of mounting pieces 14. Crossbeam 12 includes main board 120 and side panel 122. Side panel 122 is fixed on main board 120 and is perpendicular to side panel 120. Each mounting piece 14 is fixed on side panel 122 and is perpendicular to side panel 122. In one embodiment, main board 120, side panel 122 and the plurality of mounting pieces 14 are molded in an integrated manner. Main board 120 is made by bending one side of side panel 122. Each mounting piece 14 is made by bending the other side of side panel 122. Opening 16 is formed between mounting piece 14 and side panel 122. Each mounting piece 14 is parallel to main board 120 and parallel to the horizontal plane. At least one fixing hole 140 and at least one mounting hole 142 are provided on each mounting piece 14. In one embodiment, fixing hole 140 is circular. Mounting hole 142 is oval.

Backrest component 30 includes connecting rod 32, the first rotation point 320 is provided on the end of connecting rod 32. Main body 40 includes the first connecting plate 42 and the second connecting plate 44. The second connecting plate 44 is fixed to the first connecting plate 42. The second rotation point 420 and the third rotation point 422 are provided on the first connecting plate 42. The elastic element is a spring.

When quick mounting holder structure for sinking mechanical extension device of functional sofa 100 is assembled, stretchable component 20 is rotatably mounted on main body 40. Mounting support 10 is rotatably mounted on the first connecting plate 42 through the second rotation point 420 and the third rotation point 422. Connecting rod 32 of backrest component 30 is rotatably mounted on the second connecting plate 44 through the first rotation point 320. The first hanging column 50 is fixed on the first connecting plate 42 and is located between the second rotation point 420 and the third rotation point 422. The second hanging column 60 is fixed on connecting rod 32. Both ends of the spring are fixed on the first hanging column 500 and the second hanging column 60 respectively.

Figure 5:
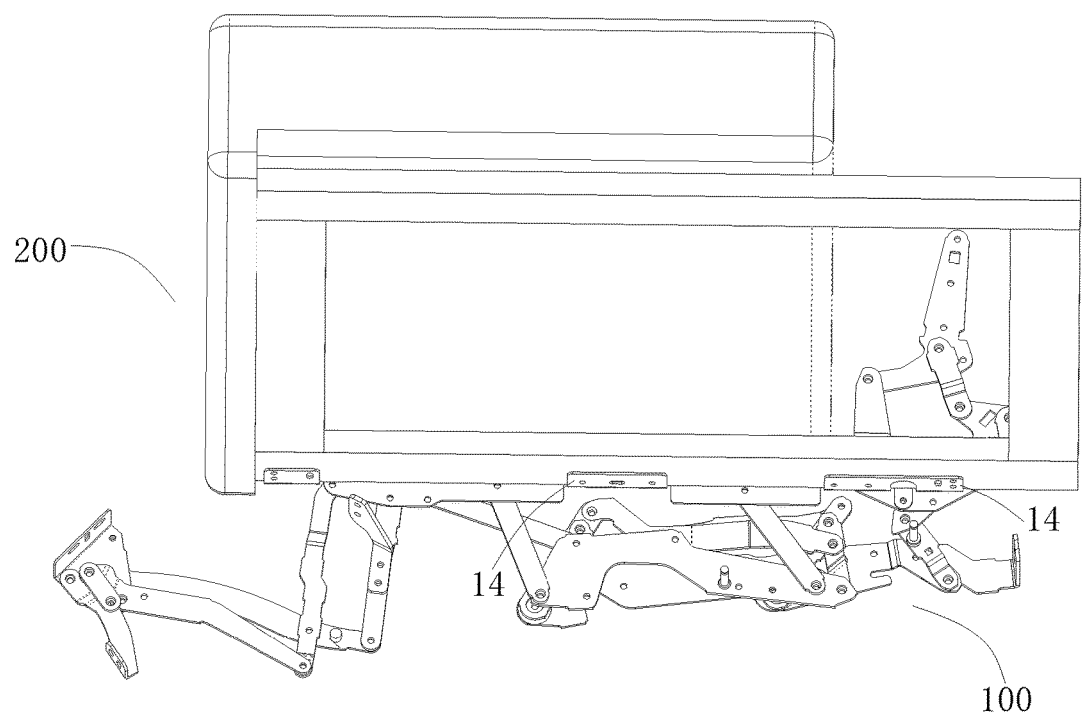
FIG. 5 is an assembly diagram of the quick mounting holder structure for sinking mechanical extension device of functional sofa shown in FIG. 1.
Figure 6:
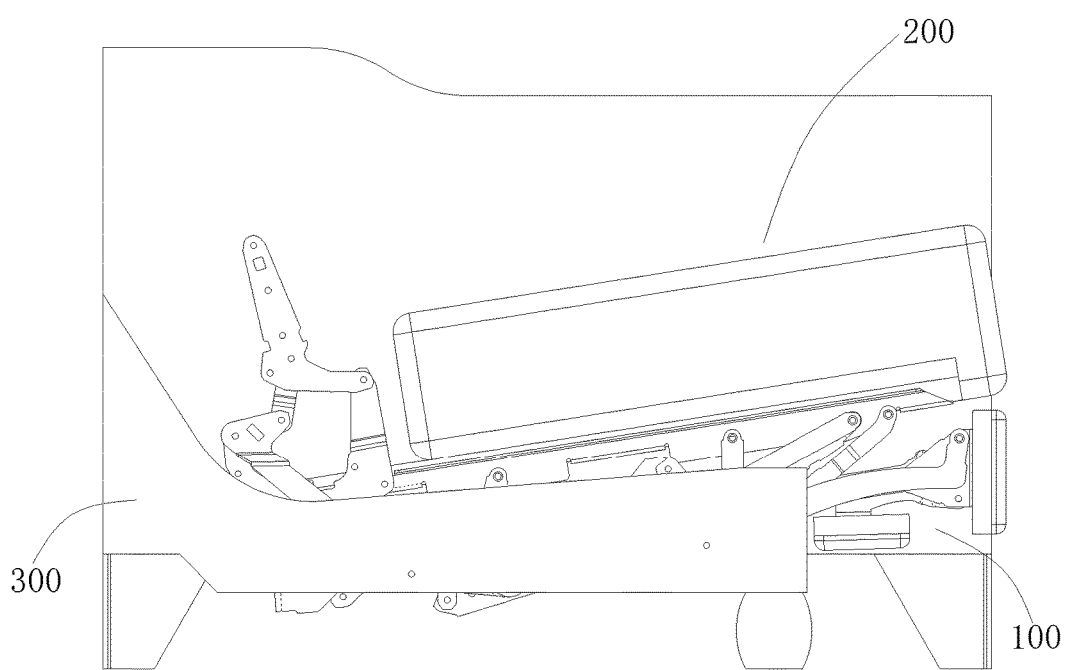
FIG. 6 is an installation diagram of the quick mounting holder structure for sinking mechanical extension device of functional sofa shown in FIG. 5.

Referring to FIG. 5 and FIG. 6, when quick mounting holder structure for sinking mechanical extension device of functional sofa 100 is in use, quick mounting holder structure for sinking mechanical extension device of functional sofa 100 is turned over, wooden frame 200 of the rocking chair is put under quick mounting holder structure for sinking mechanical extension device of functional sofa 100. With mounting hole 142 of mounting piece 14, quick mounting holder structure for sinking mechanical extension device of functional sofa 100 and wooden frame 200 can be fixed by an electric drill using screws. Base 300 is fixed in main body 40.

In the present invention, since mounting piece 14 is provided in the middle of side panel 122, the height of mounting piece 14 is lowered, so that the height of the whole sofa or rocking chair is lowered. Thus, the comfortableness of the user is improved. Moreover, the whole quick mounting holder structure for sinking mechanical extension device of functional sofa 100 rotates around the first rotation point 320, the second rotation point 420, and the third rotation point 422. The second rotation point 420 and the third rotation point 422 are located on the first connecting plate 42. The first rotation point 320 is located on connecting rod 32. The first hanging column 50 is fixed on the first connecting plate 42. The second hanging column 60 is fixed on the connecting rod 32. Both ends of the spring are fixed on the first hanging column 50 and the second hanging column 60 respectively, so that the acting force directly works on the part on which each rotation point is located. No intermediate part is required to deliver the acting force. Therefore, the operation smoothness of quick mounting holder structure for sinking mechanical extension device of functional sofa 100 is improved.

For the skilled person in the art, various corresponding modifications and alternations can be made based on the technical solution and concept described above. All such modifications and alternations should fall within the scope of the claim of the present invention.

What is claimed is:

1. A quick mounting holder structure for sinking mechanical extension device of functional sofa, comprising
   a mounting support;
   a stretchable component;
   a backrest component; and
   a main body;
   wherein
   the mounting support, the stretchable component, and the backrest component are rotatably installed on the main body;
   characterized in that: the mounting support includes a crossbeam and at least one mounting piece;
   the crossbeam includes a side panel;
   the at least one mounting piece is fixed on the side panel;
   the at least one mounting piece is perpendicular to the side panel; and
   at least one fixing hole and at least one mounting hole are provided on the at least mounting piece;

wherein the at least one mounting piece is made by bending the side panel with; and an opening is formed between the at least one mounting piece and the side panel.

2. The quick mounting holder structure for sinking mechanical extension device of functional sofa of claim 1, characterized in that; the at least one mounting piece is parallel to a horizontal plane.

3. The quick mounting holder structure for sinking mechanical extension device of functional sofa of claim 1, characterized in that: the at least one fixing hole is a circular hole.

4. The quick mounting holder structure for sinking mechanical extension device of functional sofa of claim 1, characterized in that: the at least one mounting hole is an oval hole.

5. The quick mounting holder structure for sinking mechanical extension device of functional sofa of claim 1, characterized in that: the main body includes a first connecting plate and a second connecting plate;
- the second connecting plate is fixedly connected to the first connecting plate;
- a second rotation point and a third rotation point are provided on the first connecting plate;
- the mounting support is rotatably connected to the main body via the second rotation point and the third rotation point;
- the backrest component includes a connecting rod;
- a first rotation point is provided on the connecting rod; and
- the backrest component is rotatably connected the main body via the first rotation point.

6. The quick mounting holder structure for sinking mechanical extension device of functional sofa of claim 5, characterized in that: further comprising
- a first hanging column;
- a second hanging column; and
- an elastic element;

wherein
- the first hanging column is fixed on the first connecting plate;
- the second hanging column is fixed on the connecting rod; and
- both ends of the elastic element are fixed on the first hanging column and the second hanging column respectively.

7. The quick mounting holder structure for sinking mechanical extension device of functional sofa of claim 6, characterized in that: the first hanging column is located between the second rotation point and the third rotation point.

8. The quick mounting holder structure for sinking mechanical extension device of functional sofa of claim 6, characterized in that: the elastic element is a spring.

* * * * *